Oct. 3, 1950     E. F. OUIMETTE     2,524,468
CHUCK
Filed April 19, 1946
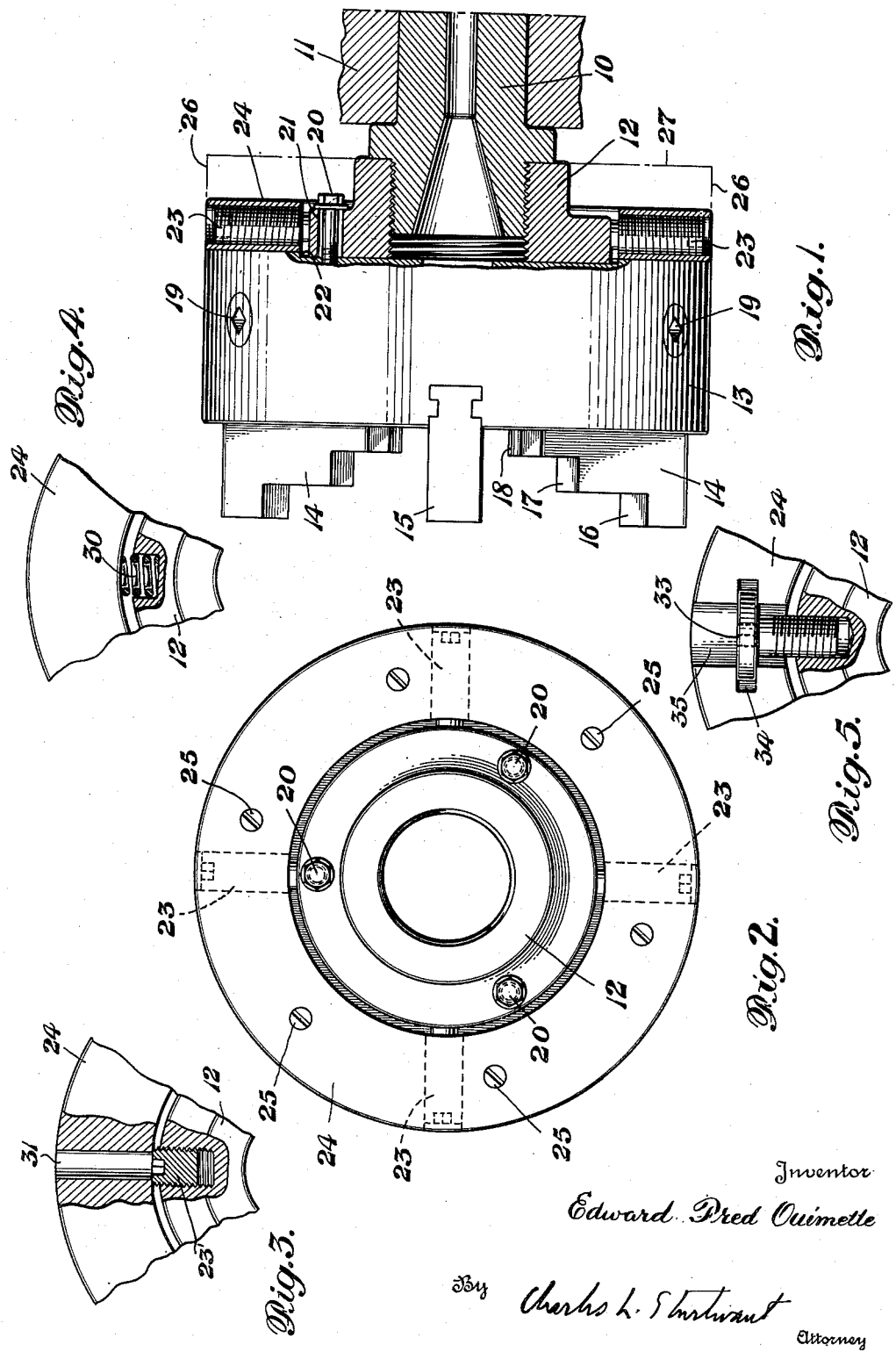
Inventor
Edward Fred Ouimette
By Charles L. Sturtevant
Attorney Patented Oct. 3, 1950

2,524,468

UNITED STATES PATENT OFFICE 2,524,468

CHUCK

Edward Fred Ouimette, Swanton, Vt., assignor to Champlain Motors, Inc., St. Albans, Vt., a corporation of Vermont Application April 19, 1946, Serial No. 663,257

13 Claims. (Cl. 279—6)

1

The present invention relates to new and useful improvements in work or implement holders, and more particularly to improvements in supporting means for universal chucks and the like.

Chucks having movable jaws for holding the work piece or tool may be generally classified as independent or universal types. In the former type, the jaws move independently of each other and may be disposed in various relative positions. In the latter type, the jaws are constrained to move in unison by some suitable means, such as a disk shaped scroll adapted to engage all of the jaws simultaneously or by some other type of mechanism which performs the same function. This invention is primarily concerned with this latter type of chuck and the expression, "universal chuck," as hereinafter referred to, is to be construed to mean any type of chuck having simultaneously movable jaws. Chucks of this type include two jaw chucks which are usually employed for holding square or rectangular work; three jaw chucks for holding round or hexagonal work, and four jaw chucks for square or round work. This invention is not limited to any specific number of jaws nor to any particular type of jaw actuating mechanism although it may find its widest application at present to three jaw universal chucks.

In a well constructed universal chuck, when new, the jaws will hold and, if desired, rotate the work or tool so that the geometric axis thereof remains on a fixed axis. As the chuck jaws or the jaw shifting mechanism becomes worn, unless the wear is exactly uniform, the chuck will no longer hold and rotate the work about the desired axis. In order to overcome this situation, it is a common expedient to place shims between one or more of the jaws and the work so as to shift the work in the jaws to a position where it will rotate about its geometric axis. This is a cumbersome procedure, especially if a plurality of pieces must be chucked. Another expedient is to regrind or remachine the chuck jaws but such an expedient is satisfactory only when the wear in the operating mechanism for the jaws has been uniform, but if such wear has not been uniform, then the jaws will be accurate only when a piece of work of particular size is chucked.

This invention is concerned with overcoming the above mentioned difficulties in such a manner that, regardless jaw wear or uniform or non-uniform wear of the jaw actuating mechanism, the chuck can be made to rotate a work piece or tool about its geometric axis.

One of the principal objects of the present invention is to provide means adapted to place a chuck relative to its driving spindle so that a work piece held thereby will be rotated on its geometric axis.

Another object of the invention is to provide a device of the above type which will substantially extend the useful life of a universal chuck in so far as doing highly accurate work is concerned.

Another object of the invention is to provide a chuck adjusting device that results in no additional overhang to the chuck with respect to its supporting spindle whereby to retain the rigidity of the work or tool.

A still further object of the invention is to provide a chuck adjusting device of the above type which can be conveniently formed as a part of newly manufactured chucks or which can be readily incorporated in existing accurate or inaccurate chucks.

The above and other objects of the invention will in part be obvious and will be hereinafter pointed out by reference to the following specification, the accompanying drawing and the appended claims.

In the accompanying drawing:

Figure 1 is a side elevation, partly in section, showing a chuck assembly with one embodiment of the invention.

Figure 2 is a rear face view of the chuck with the spindle removed.

Figure 3 is a fragmentary section showing a modified form of centering means for the chuck.

Figure 4 is view, similar to Figure 3, but showing a further modification which may be employed with the embodiments of Figures 1 and 2, or Figure 3.

Figure 5 is a view, similar to Figures 3 and 4, but showing a further modification.

Referring to the accompanying drawing, there is shown a spindle 10 which may be the spindle of a lathe, milling machine, drill press or any other material working machine for metal, wood or other substance. The spindle 10, which may be driven from any suitable source of power, is rotatably supported by the suitable bearings, one of which is shown at 11. A conventional chuck back plate 12, slightly altered as will be pointed out hereinafter, is threadedly or otherwise suitably secured to the spindle 10 and on this plate is carried a universal chuck 13 which is illustrated as being of the three jaw type. The jaws 14 have external holding surfaces 15 for chucking the internal surface of a work piece, and internal stepped holding surfaces 16, 17, and 18 for chucking the external surfaces of a work piece. The chuck may also be equipped with a spare set of jaws having the steps 16, 17 and 18 facing outwardly rather than inwardly as is well known in the art. All of the jaw surfaces are subject to wear and this wear is one of the factors which renders the chuck inaccurate. The other factor is the wear of the jaw operating mechanism within the body of the chuck, this mechanism being a scroll disc, gearing, or other suitable mechanism which operates to shift the jaws simultaneously. A conventional actuator 19 is adapted to receive a chuck wrench for operating the jaw actuating means (not shown).

If the wear factors mentioned above have affected accuracy of the chuck, a circular piece of work, for example, placed in the jaws, will not rotate about its geometric axis, and a cutting tool placed thereagainst will not remove material uniformly until sufficient of the material is removed to establish a new circular surface, but this new surface will, of course, be eccentric to the portion of the work piece held in the chuck. While this may be immaterial in many cases, there are many other cases where the new surface must be concentric with the portion of the work which is held in the chuck, and the structure to be described below renders this possible.

The chuck body is secured to the back plate 12 by screws 20 which threadedly engage the chuck body. In some constructions, the screws serve to fixedly position the chuck on the back plate; while, in others, the chuck body is fixed or located by a shoulder or skirt which fits over the outside of the back plate. According to the present invention, the screw holes 21 through the back plate 12 are made larger than the screws 20 to the desired degree so that the chuck may be shifted relative to the back plate, thus to shift the geometric axis of the work piece into alignment with the geometric axis of the spindle 10. If the chuck is of an existing type having a shoulder 22 disposed around the outside of the back plate to maintain fixed location of parts, the outside diameter of the back plate would be reduced or the internal diameter of the shoulder would be enlarged to provide the desired amount of clearance to permit sufficient shifting of the chuck relative to the back plate for the purposes desired.

As shown in Figures 1 and 2, shifting of the chuck relative to the back plate 12 is effected by means of centering screws 23 which threadedly engage corresponding radial openings in a ring 24 which is in the form of an annulus extending around the flange of the back plate and secured to the chuck body. In existing chucks, this ring could be secured by screws 25 or the like engaging existing holes in the chuck body, or newly threaded holes could be provided for this purpose. If the invention is embodied in newly manufactured chucks, the ring 24 could be attached as above, or it could be formed as an integral part of the chuck body. The inner ends of the screws 23 abut or otherwise engage the circumferential edge of the flange of the back plate. The centering screws 23 which would usually be at least three in number, but preferably four, may be of the socket head type, if desired, and operated by insertion therein of a suitable form of key wrench. Thus, the entire screw is disposed within the periphery of the ring 24 so that no portion thereof will present a hazard likely to tear or entangle parts of the body or clothing of the operator. It will also be observed that the entire chuck shifting mechanism presents no additional overhang to the chuck adjacent its supporting bearing. Likewise, the shifting means is incorporated in an existing available space which would otherwise be of no particular use. This space is illustrated in Figure 1 as defined by the dotted lines 26 which represent a circumscribed cylinder contiguous with the periphery of the chuck body, and the dotted line 27 which represents a plane parallel to the chuck mounting surface and passing through approximately the outer extremity of the back plate.

In operation, the work piece, cutter, or the like, which is to be rotated, is placed in the jaws and held thereby upon operation of the actuator 19. Assuming that the geometric axis of the work piece is not on the geometric axis of the spindle, the screws 20 are loosened slightly and the chuck body shifted relative to the back plate 12 by selective manipulation of the screws 23. This operation is similar to chucking a piece of work in a four jaw independent chuck in that one screw will be loosened and the opposite one tightened, etc., until the work piece is properly positioned. When the chuck has been shifted so that the surface of the work runs true and this can be tested by a dial or other type of indicator, the screws 20 are tightened and the chuck thereafter will rotate all pieces of that particular size about the geometric axes.

If the wear of the chuck is solely on the jaws and there is little or no wear on the jaw operating mechanism, it will often be found that a single adjustment will true up the chuck so that it will rotate pieces of different sizes about their geometric axes. In other instances as where the jaw operating mechanism is worn, it will often be necessary to again true up the chuck when the diameter of the work piece is changed. When readjusted under these conditions, however, the chuck will continue to hold work pieces of the same size in the same position relative to the spindle without further adjustment.

In Figure 3, there is shown a modification wherein the screws 23' threadedly engage the back plate 12 rather than the annular ring 24, as in Figures 1 and 2. Radial openings 31 extend through the ring 24 in order to readily permit insertion of a suitable tool for actuating the screws 23', the outer ends of which engage the inner surface of the ring around the openings 31 therethrough so as to effect the desired relative shifting of the chuck with respect to the back plate.

In Figure 4, there is shown a further modification which may be incorporated in the adjusting means of Figures 1 and 2, or of Figure 3. In this form of the invention, two of the adjacent centering screws 23 or 23' are omitted and replaced by springs 30 disposed in the screw recesses so as to bear against the inner surface of the ring 24. Thus, it is possible to effect adjustment of the chuck with two rather than four screws, each screw acting to move the chuck in one direction and the opposed companion spring acting to move it in the opposite direction.

While the invention has been shown in connection with universal chucks, it is apparent that the invention has other applications. Thus, the chuck could be in the form of a conventional face plate adjustably connected to the back plate in the manner pointed out above and if so employed, a work piece could be clamped to the face plate by means of T-slots, straps, etc., as is well understood in the art, and the face plate shifted so that a desired point can be located on the geometric axis of the spindle. Such an arrangement is particularly useful with heavy work which is otherwise difficult to shift. Thus, for accurate work, such as die boring, a prick punch mark could represent the axis of a desired hole and this mark could then be dial indicated until it runs true, adjustment being achieved by the screws of the present invention rather than by loosening and tapping the work on the face plate as is the usual practice.

Another modification is shown in Figure 5 wherein adjustment of the chuck is effected by two rather than four adjusting screws but differs from the showing of Figure 4 in that the springs are omitted. In this form of the invention, two threaded holes substantially 90 degrees apart are formed radially in the periphery of the back plate 12 (only one being shown) for receiving threaded adjusting screws 32 (only one shown since both are identical) each of which has a collar head 33 adapted to engage in a slot 34 in the ring 24, this slot being somewhat longer than the diameter of the head 33. A suitable opening 35 in the ring 24 permits of a wrench into the socket head of the adjusting screw. It is apparent that rotation of one of the screws 32 in either direction will effect movement of the chuck relative to the back in either of two opposite directions and since two screws are provided, the desired adjustment in any radial direction may be accomplished as previously described. While the adjusting screws are shown with a head engaging a slot in the ring 24, this is merely for purposes of illustration, and the parts could be reversed, that is, the slot and collar head could be in the back plate with the threaded portion engaging a threaded opening in the ring. In this case, the wrench socket would be in the end of the threaded portion opposite to that shown.

While a specific manner of attaching the ring 24 to the chuck body has been shown for purposes of illustration, other means of attachment will become apparent from the above disclosure and description of the invention. Also, while centering screws are shown mounted in a single annular ring, it is obvious that they could be mounted in individual lugs projecting from the back of the chuck. It is also obvious that the shifting means could be in the form of eccentrics, cams, wedges, etc. for the same purpose.

It is to be clearly understood that various changes in the details of construction and arrangement of parts may be made without departing from the scope and spirit of the invention as set forth in the appended claims.

I claim:

1. A universal jaw chuck, comprising a rotatable supporting back plate having a face mounted in direct contact with a corresponding face on said chuck, radially disposed means engageable with said face exteriorly of the contacting area thereof with the face of the chuck for effecting relative shifting of the said chuck and means for securing said faces together in a plurality of radial directions of adjustment.

2. A universal chuck comprising a rotatable back plate having a face mounted in direct contact with a corresponding face on said chuck, fastening means for securing said faces directly together in any radial direction of adjustment, and adjusting means disposed radially exteriorly of said fastening means and of the contacting area between said faces for moving said chuck relative to said back plate to the desired locus of radial adjustment.

3. In a substantially cylindrical work holder, the combination of a back plate having a face secured to the adjacent face on the work holder, a ring member secured to the chuck and surrounding said back plate radially and exteriorly thereof means cooperating with said ring member for adjusting the work holder relative to the back plate in any radial direction and means independent of said ring member for securing the work holder to the back plate in adjusted positions and both said means being disposed within the confines of a space defined by a cylindrical surface substantially contiguous with the periphery of said work holder and a plane parallel to said faces and passing substantially along the outermost extremity of said ring member.

4. A rotatable work holder comprising, in combination, a back plate having a radial flange directly and releasably secured in face-to-face contact to the work holder and adapted to be carried by a rotating spindle, wall means on the work holder disposed radially exteriorly of the flange on said back plate, means cooperating between said flange and said wall means for adjusting the work holder radially of said back plate, and means passing through said flange and directly into the work holder for securing the work holder in direct contact with the flange of the back plate in adjusted position.

5. An attachment for a universal jaw chuck comprising a rotatable back plate having a flange with a face adapted to be directly mounted to a corresponding juxtaposed face on the chuck, means for securing said faces together in any radial direction of adjustment, a ring adapted to be mounted on said chuck in a position radially encompassing said back plate flange, and means cooperating with said ring and said flange for moving the chuck relative to said back plate in any radial direction of adjustment.

6. An attachment for a universal jaw chuck comprising a rotatable back plate having a face adapted to be mounted to a corresponding juxtaposed face on the chuck, means for securing said face together in any radial direction of adjustment, first screw means for moving said chuck relative to said back plate in one direction, first resilient means for moving said chuck relative to said back plate in an opposite direction, second screw means for moving said chuck relative to said back plate in a direction substantially at right angles to the first direction and second resilient means for moving said chuck relative to said back plate in a direction opposite to the last named direction.

7. A universal chuck comprising a rotatable back plate adapted to be connected to a spindle and having a radial flange disposed within the periphery of the chuck and in face to face surface contact therewith, fastening means directly engaging said flange for securing the same to the chuck, means substantially in the form of an annulus carried by the chuck and disposed exteriorly and radially around said flange and having spaced radial openings therethrough, and threadedly mounted elements operatively cooperating between said flange and said annulus and accessible for adjustment through said openings to effect relative radial adjustment between the chuck and said back plate.

8. A universal chuck as claimed in claim 7, wherein said elements threadedly engage said flange in a radial direction and engage said annulus around the openings therethrough.

9. A universal chuck as claimed in claim 7, wherein said elements are provided with a collar at one end thereof operating within a slot to afford the connection between said flange and said annulus.

10. A universal chuck as claimed in claim 7, wherein adjusting movements of said elements in one direction are opposed by spring means operating in the opposite direction.

11. An attachment for a universal chuck comprising an annular ring member having a plurality of spaced radial openings extending therethrough and threaded adjusting elements carried within said openings and accessible through said openings with the outer ends of said elements disposed entirely within the outer perphery of said ring member.

12. A universal jaw chuck comprising a chuck body, means providing an annular wall member extending substantially peripherally around the rear face of said chuck body, a back plate disposed wholly within said wall member and in direct facial contact with said chuck body within the said annular wall member, fastener elements directly engaging said back plate and said chuck body for securing the same together in selected positions of relative adjustments, and means disposed radially exteriorly of said fastener elements and operatively cooperating between said wall member and said back plate for effecting relative adjustment of said chuck body.

13. A universal jaw chuck as claimed in claim 12, wherein the back plate terminates in a radial flange disposed within said wall member and in direct facial contact with the chuck body and through which the fastener elements extend, and wherein the adjusting means includes radially extending screws threadedly mounted in said annular wall member and abutting the adjacent edge of said back plate flange.

EDWARD FRED OUIMETTE.

REFERENCES CITED

The following references are of record in the file of this patent:

UNITED STATES PATENTS

| Number | Name | Date |
|---|---|---|
| 327,791 | Gregory | Oct. 6, 1885 |
| 450,234 | Johnson | Apr. 14, 1891 |

FOREIGN PATENTS

| Number | Country | Date |
|---|---|---|
| 60,084 | Austria | July 10, 1913 |
| 363,869 | Germany | Dec. 6, 1922 |